B. W. TUCKER.
BARREL MACHINE.
APPLICATION FILED OCT. 14, 1911.
1,152,575.
Patented Sept. 7, 1915.
10 SHEETS—SHEET 5.
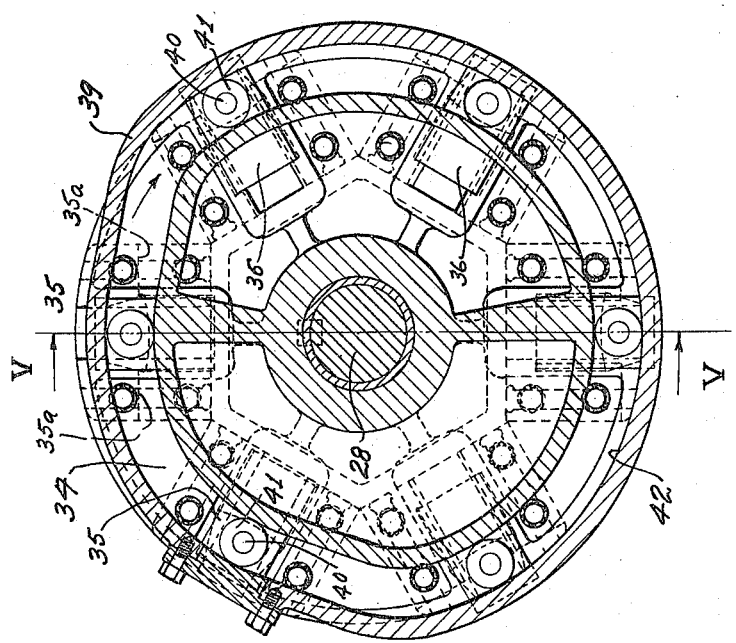
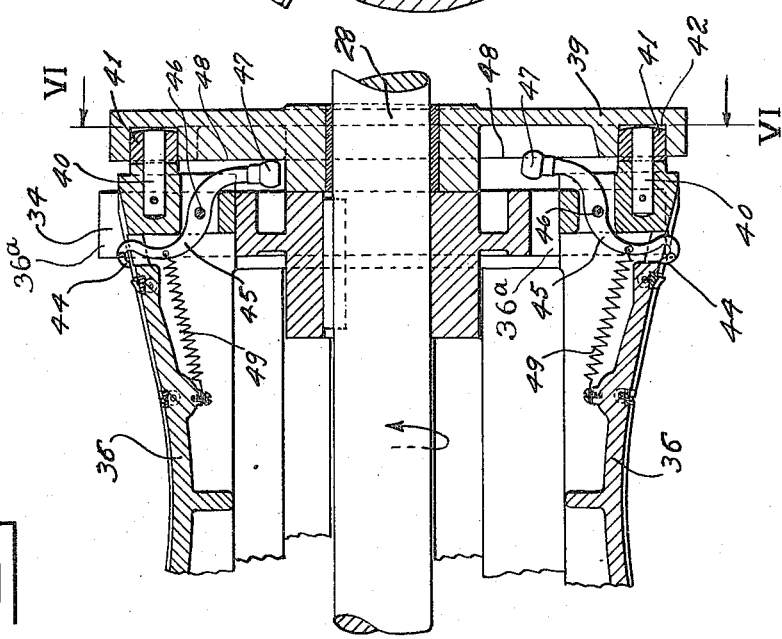
Witnesses:
C. Bartels
L. S. Mayer
Inventor
B. W. Tucker
By his Attorneys
Criswell & Criswell B. W. TUCKER.
BARREL MACHINE.
APPLICATION FILED OCT. 14, 1911.
1,152,575.
Patented Sept. 7, 1915.
10 SHEETS—SHEET 6.
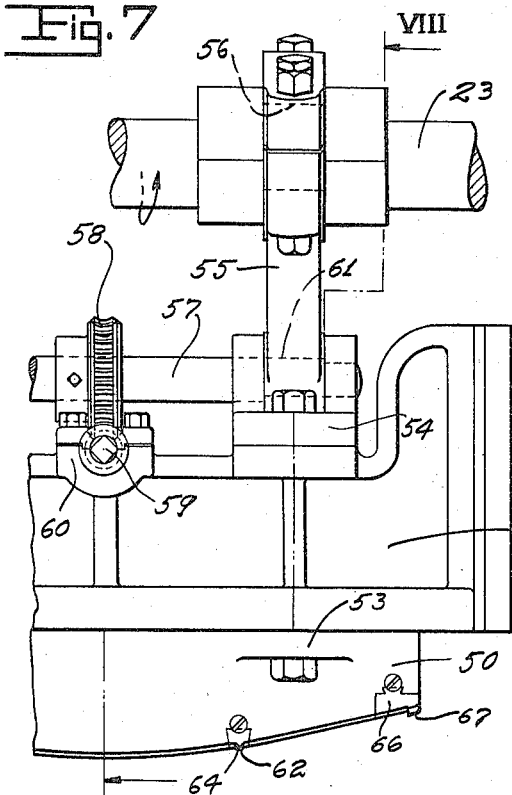
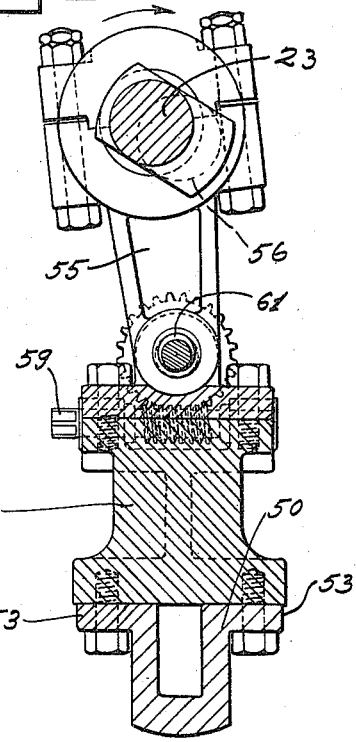
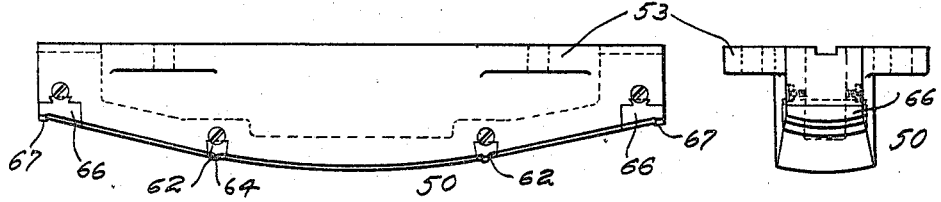
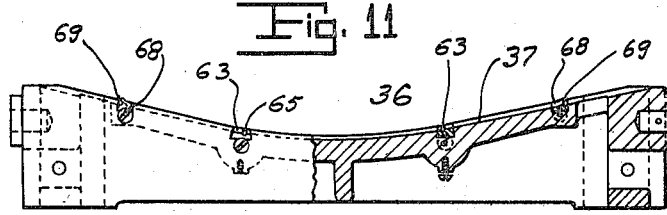
Witnesses:
C. K. Bartels.
L. L. Mayer.
Inventor
B. W. Tucker
By his Attorneys
Criswell & Criswell.

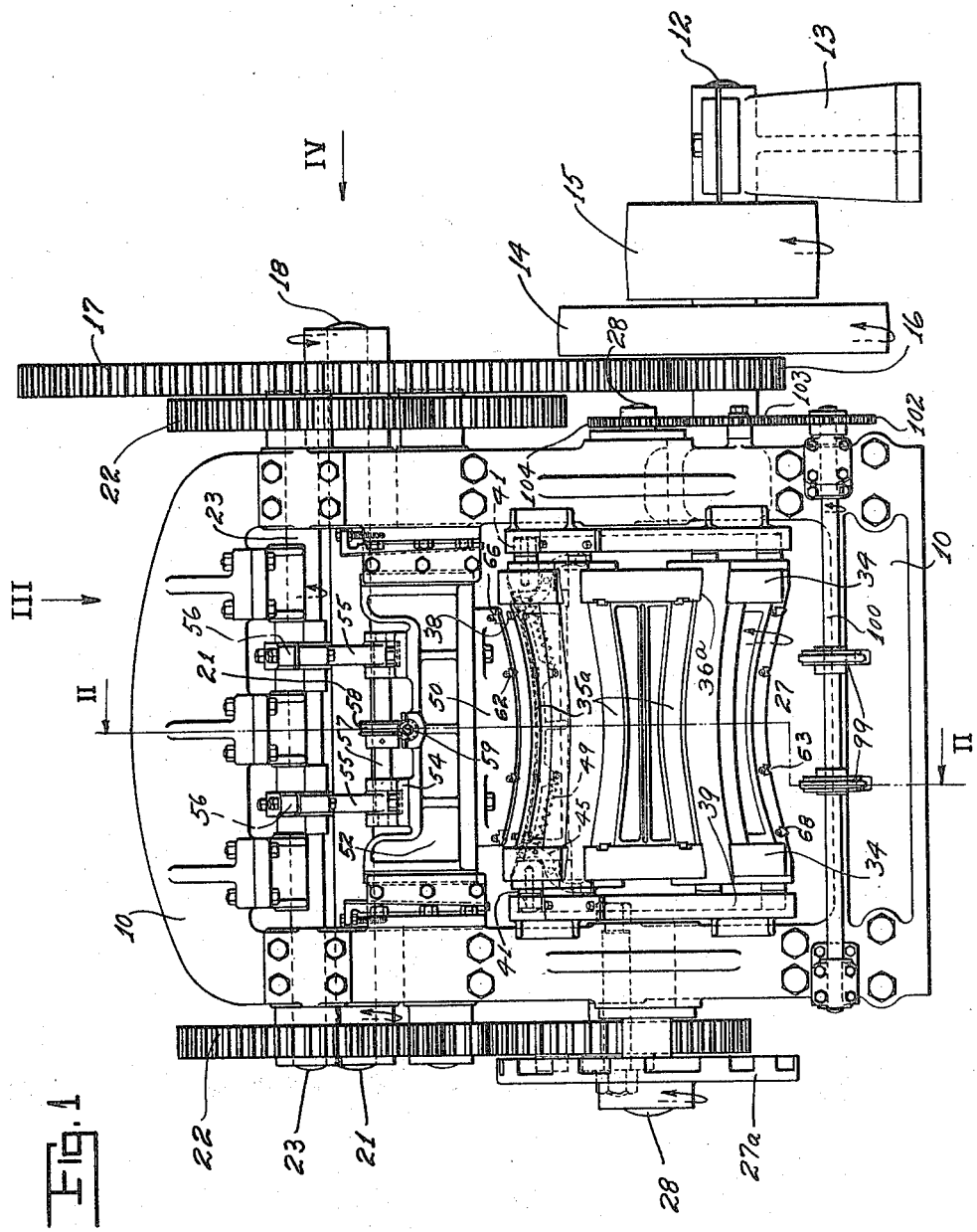

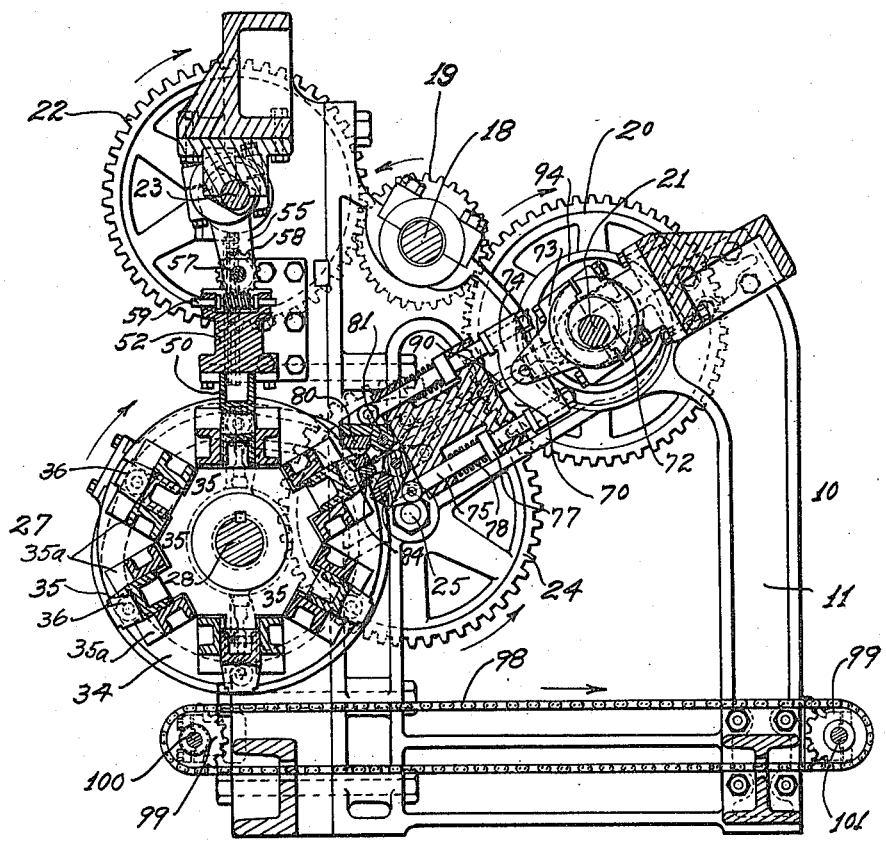

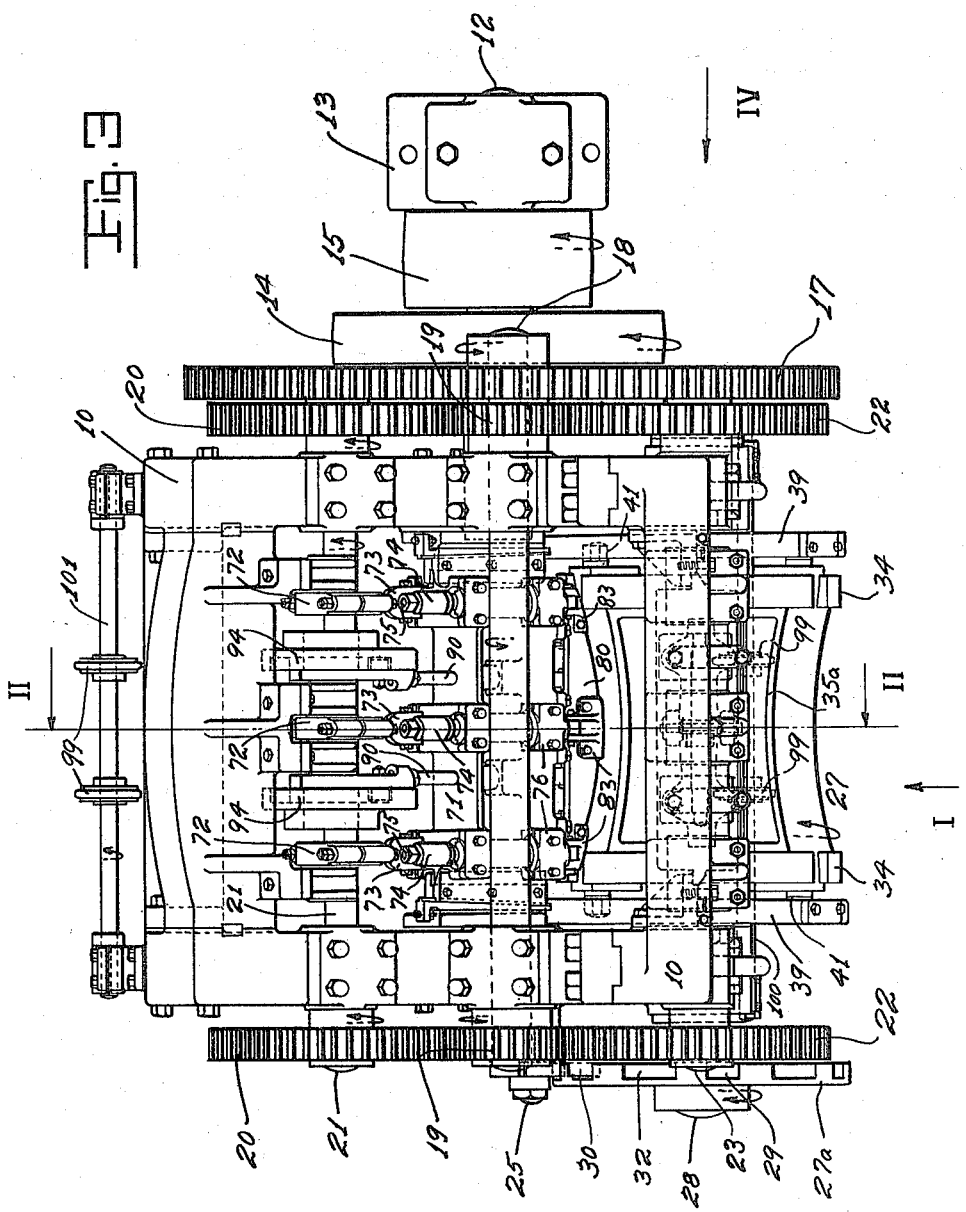

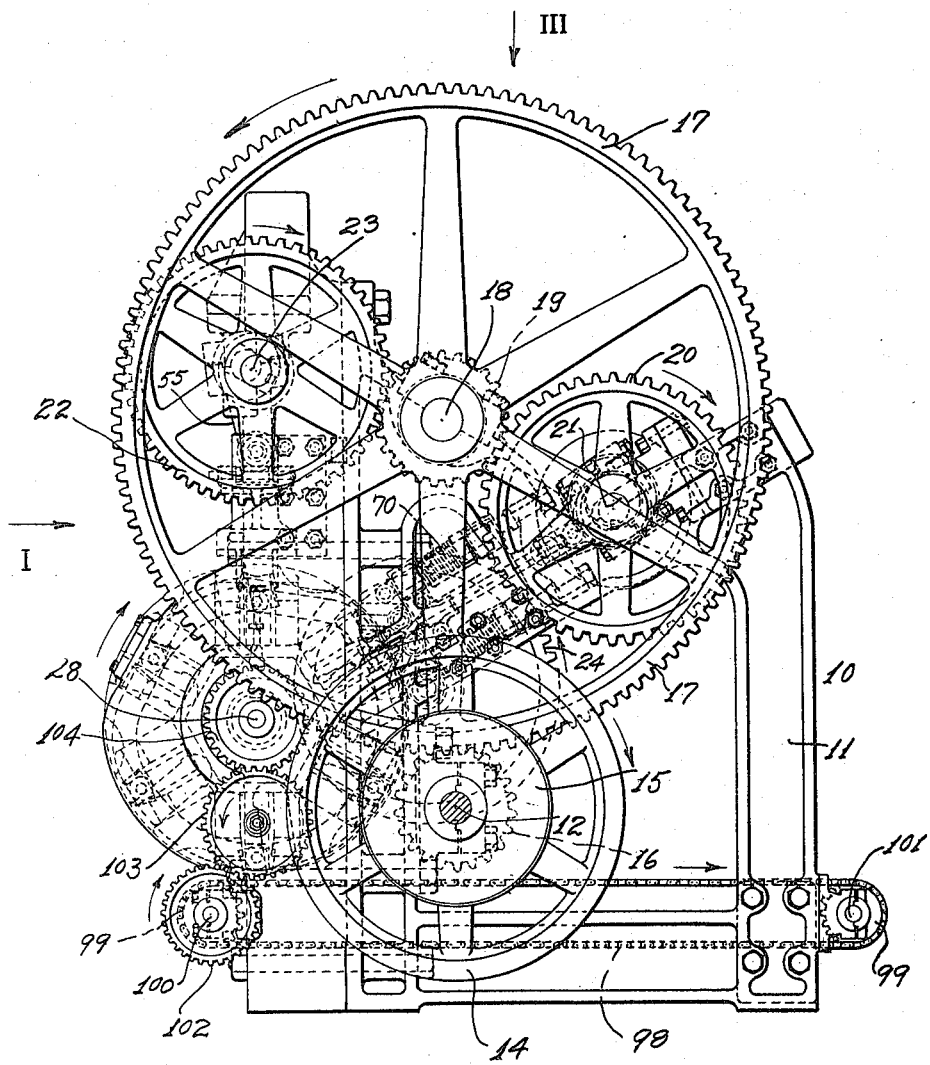

B. W. TUCKER.
BARREL MACHINE.
APPLICATION FILED OCT. 14, 1911.
1,152,575.
Patented Sept. 7, 1915.
10 SHEETS—SHEET 7.
Fig. 13.
Fig. 14.
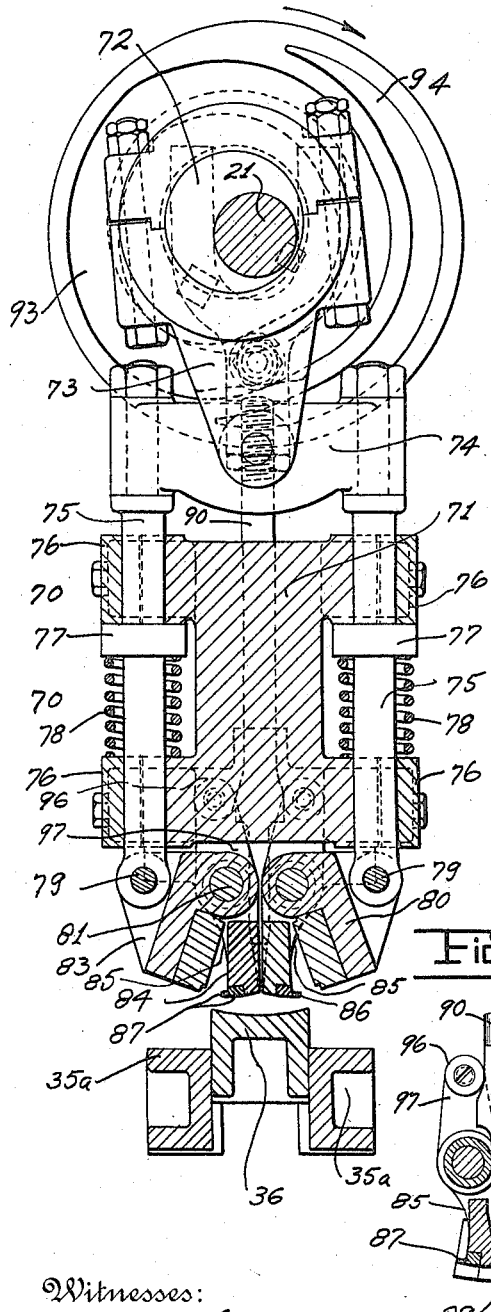
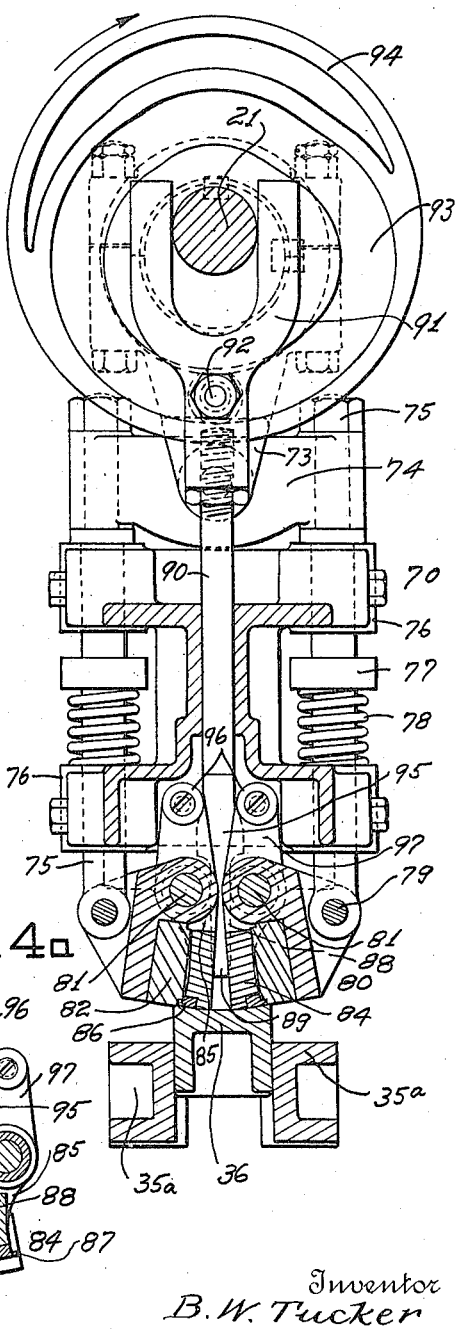
Fig. 14a.
Witnesses:
C. H. Bartels.
L. C. Mayer.
Inventor
B. W. Tucker
By his Attorneys
Criswell & Criswell

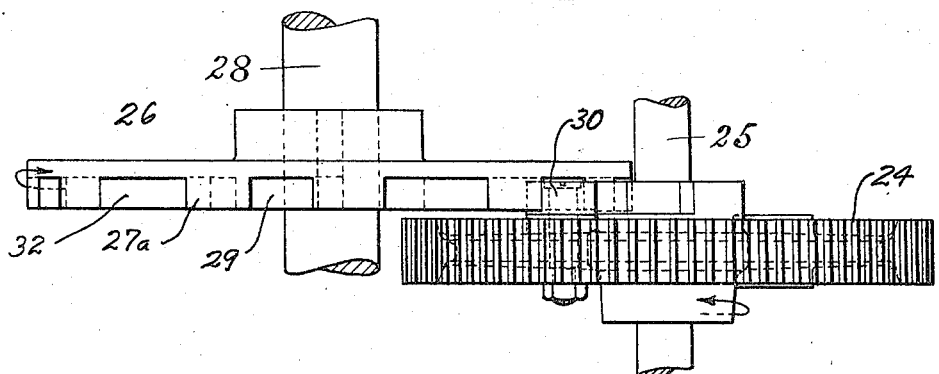
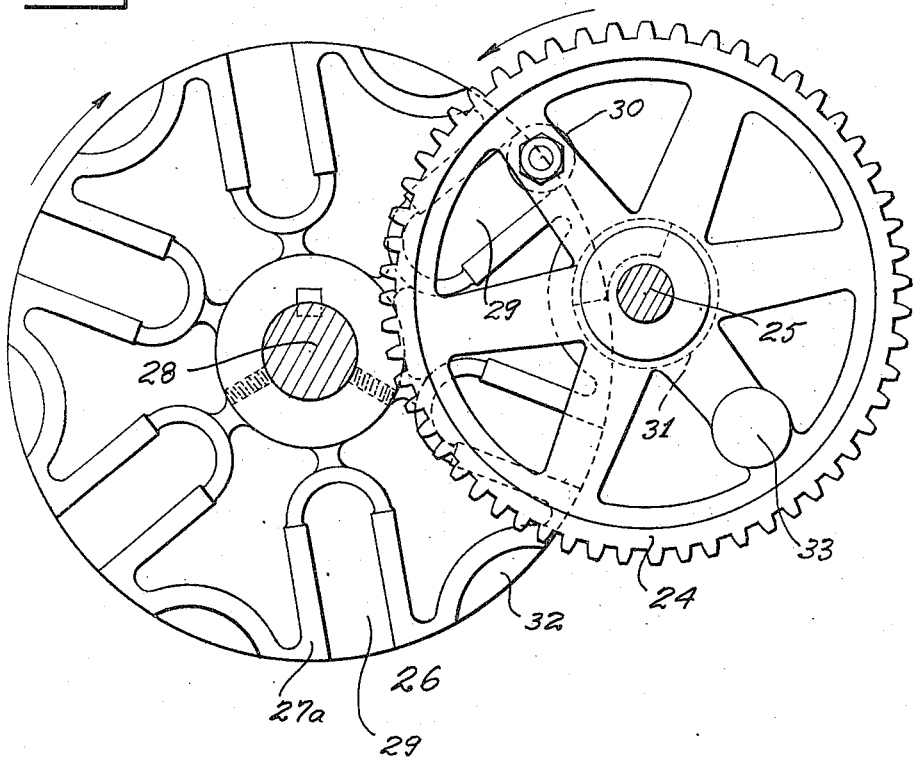

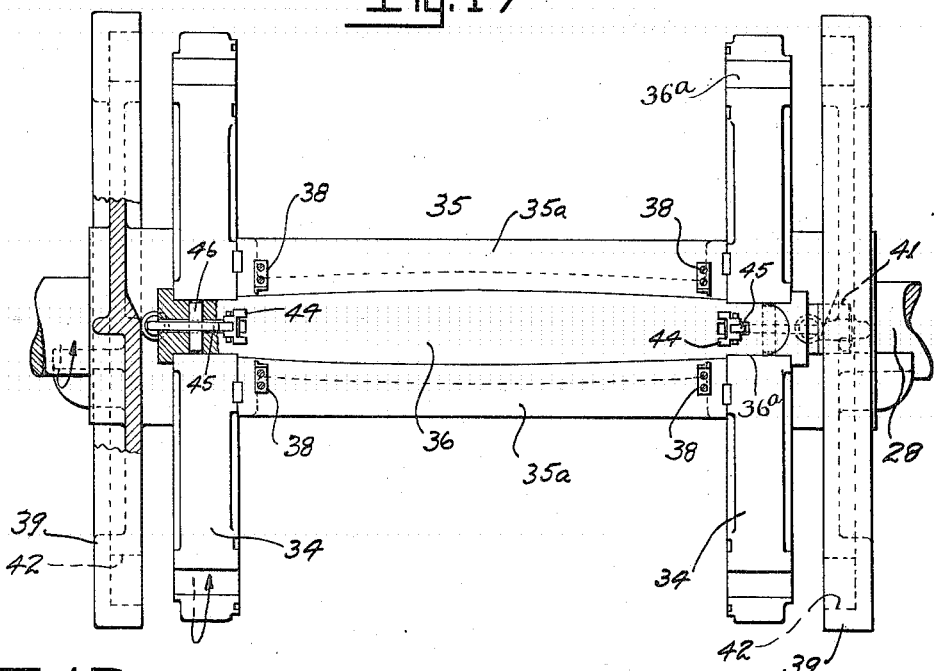

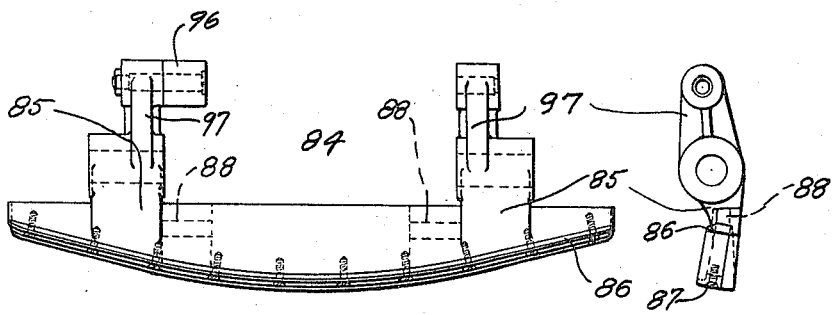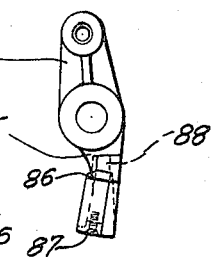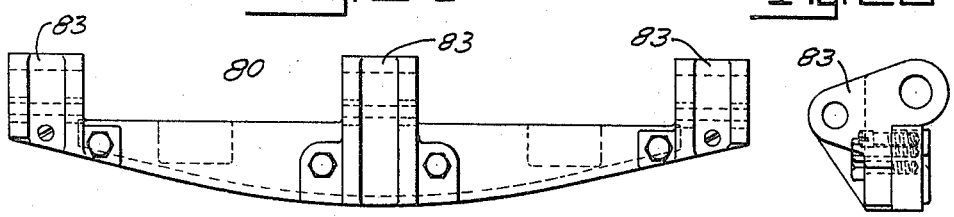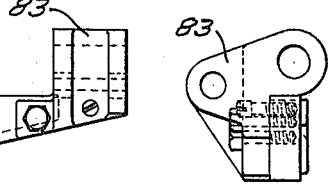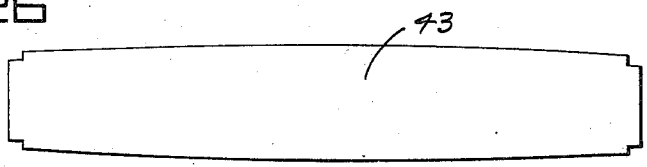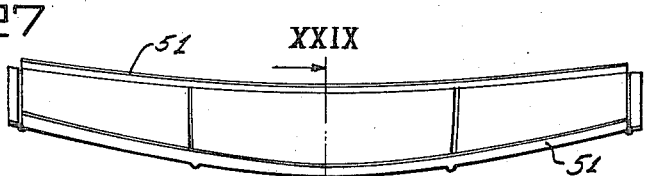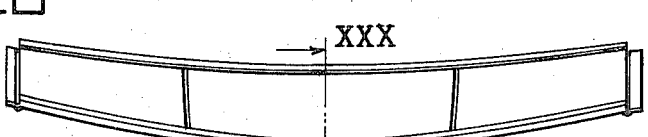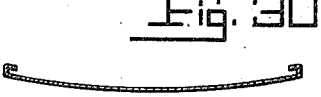

UNITED STATES PATENT OFFICE.

BENJAMIN W. TUCKER, OF SOUTH ORANGE, NEW JERSEY.

BARREL-MACHINE.

1,152,575.   Specification of Letters Patent.   Patented Sept. 7, 1915.

Application filed October 14, 1911. Serial No. 654,723.

*To all whom it may concern:*

Be it known that I, BENJAMIN W. TUCKER, a citizen of the United States, and a resident of South Orange, county of Essex, and State of New Jersey, have invented certain new and useful Improvements in Barrel-Machines, of which the following is a full, clear, and exact description.

This invention relates more particularly to a machine for forming steel barrel staves adapted when assembled to provide a knockdown barrel having interlocking elements to hold and clamp the staves together, such as disclosed in United States Patent No. 967,629, granted to James H. George, Aug. 16, 1910.

The primary object of the invention is to provide a simple and efficient machine in which stave blanks may be placed upon a turret or other means and the blanks bilged and flanges formed lengthwise along the edges thereof to provide locking portions for elements to hold and bind the staves rigidly together, and at the same time form offset portions at the ends of the staves for the barrel heads, and beads, grooves or projections intermediate the ends for the barrel hoops.

Another object of the invention is to provide simple and efficient flange-forming mechanism for the staves, and simple means for operating said mechanism.

A further object of the invention is to provide simple and efficient mechanism whereby flanges formed along the edges of the staves may be bent or forced over entirely automatically and in such a way that the staves may be successively presented to several independent mechanisms, and after being completed are automatically discharged upon a carrier.

With these and other objects in view, the invention will be hereinafter more particularly described with reference to the accompanying drawings, which form a part of this specification, and will then be pointed out in the claims at the end of the description.

In the drawings, Figure 1 is a front elevation of one form of machine embodying my invention. Fig. 2 is a longitudinal section, taken on the line II—II of Figs. 1 and 3. Fig. 3 is a plan view. Fig. 4 is a side elevation. Fig. 5 is a vertical section of one end of the die turret, the section being taken on the line V—V of Fig. 6. Fig. 6 is a vertical transverse section, taken on the line VI—VI of Fig. 5. Fig. 7 is an enlarged fragmentary view, showing one end of one of the bilging and flange-forming die members. Fig. 8 is a vertical section taken on line VIII—VIII of Fig. 7. Fig. 9 is a detail front view of one of the forming or die members. Fig. 10 is a detail end elevation of the die member shown in Fig. 9. Fig. 11 is a detail view, partly in section, of the turret die member of the flange-forming means. Fig. 12 is an end view of the die member shown in Fig. 11. Fig. 13 is a vertical section, partly in elevation, of the mechanism for bending over the flange of the staves. Fig. 14 is a section taken on a different line from that of Fig. 13, but of the same mechanism, showing said mechanism after the locking flanges have been bent. Fig. 14$^a$ is a fragmentary section of the bender members and the means for expanding and contracting the same. Fig. 15 is a fragmentary plan view of one form of Geneva movement that may be used for intermittently rotating the turret. Fig. 16 is a sectional view showing the Geneva movement in elevation. Fig. 17 is a detail plan view, partly in section, showing the means for alining and holding the stave blank on the turret. Fig. 18 is a section on the line XVIII—XVIII of Fig. 19, through one of the cams for moving the blank-holding levers and certain of the die members. Fig. 19 is an elevation of the cam shown in Fig. 18. Fig. 20 is a detail end view of the clamping part of one of the blank-holding devices or levers. Fig. 21 is a fragmentary side elevation of the blank-holding lever shown in Fig. 20. Fig. 22 is a front elevation of one of the members of the former shown in Figs. 13 and 14 over which the flanges are bent. Fig. 23 is an end elevation of the member shown in Fig. 22. Fig. 24 is a detail elevation of one of the bender jaws or members. Fig. 25 is an end elevation of the member shown in Fig. 24. Fig. 26 is a detail plan view of one of the blanks before being placed in the machine. Fig. 27 is a perspective view showing the longitudinally-extending flanges partly formed, and the blank formed with beads or depressions transversely thereof. Fig. 28 is a similar view to Fig. 27, except that the locking flanges along the edges lengthwise of the blanks have been bent over the body thereof. Fig. 29 is an enlarged transverse section, taken on the line XXIX—XXIX of Fig. 27; and Fig. 30 is an enlarged transverse section, taken on the line XXX—XXX of Fig. 28.

While I show and describe a machine adapted for forming a particular kind of barrel stave, it will be understood that the machine may be used for making other forms of staves by changing the shape of the forming means, and that said machine or parts thereof may be used for various purposes and in various connections.

The frame 10 of the machine may be of any suitable construction and may comprise the side members 11 which are suitably spaced apart by brace bars, beams or other suitable means. A drive shaft 12 has one end mounted upon one of the frame ends or sides and the other end journaled in a bracket or standard 13. This shaft may be provided with a balance wheel 14 and a drive pulley 15, and on the shaft 12 is a pinion 16 which meshes with a large gear 17. The gear 17 is held to one end of a shaft 18 and on this shaft 18 at each end thereof are pinions 19. These pinions or gears 19 are in mesh with gears 20 held to opposite ends of the shaft 21, and to gears 22 held at the opposite ends of the shaft 23. One of the gears 20 at one side of the machine is in mesh with the gear 24 held to a stud 25, and this gear forms a part of a Geneva movement 26 which is adapted to intermittently rotate a turret or drum 27. The turret 27 holds the stave blanks and successively presents them to mechanism to form locking flanges along the longitudinal edges thereof and to form beads or offsets transversely of the staves. The Geneva movement is substantially the same as ordinarily used in various kinds of machines and has one member, as 27ª, secured to the turret shaft 28. This member 27ª has recesses 29 which are adapted to be successively engaged by a wheel or trundle 30 carried by the gear 24. The gear 24 has the usual rotary locking portion 31 adapted to engage the recesses 32 to lock the member 27ª in any of its positions as is usual in movements of this character, the said wheel being provided with a balance portion, as at 33, if desired. Instead of the mechanism described for driving the several shafts, any suitable means may be employed.

The turret 27 not only serves as a carrier and holder for the stave blanks, but also has means as a part thereof to assist in forming the staves ready for assembling to make the barrels. As shown, the turret has two ends or heads 34 between which are the dies 35. These dies have bar-like members 35ª which are substantially U-shaped in cross-section and are arranged in pairs, and movable between each pair is a die member 36. There are six dies and a similar number of pairs of dies and guide members 35ª, although this number may vary. Each die member 36 may be properly lightened, and is guided at its ends in radial slots 36ª in the heads 34, and said member has the upper surface thereof curved lengthwise, as at 37, according to the shape of the barrel to be made to adapt the same to be easily placed on end as is usual in articles of this kind, and the face of said die member is curved transversely according to the diameter of the barrel. Each die 35 is adapted to form a seat or rest for the stave blank, and located on the die members 35ª adjacent to the ends of the member 36 and on opposite sides thereof are angular and adjustable gages 38 which are adapted to properly hold and aline the blanks with respect to said die members. Each die member 36 is enlarged centrally according to the shape of the barrel stave, the transverse curvature of which varies from the ends to the central enlarged portion according to the size of the barrel, as is usual in the construction of barrels. The die members 35ª on opposite sides of the die member 36 are concaved at their inner opposed surfaces to conform to the member 36 which has a radial inward and outward movement between the members 35ª. This inward and outward movement toward and from the center of the turret is obtained by stationary cams 39, Figs. 5, 6, 17 and 19, arranged on the shaft 28 and held against movement by means of brackets or otherwise to the machine frame. Each die member 36 has studs 40 held in the ends thereof and on said studs are rollers 41 each of which enters a cam groove or raceway 42 in the cams 39, so that as the turret is rotated by means of the Geneva movement already described, the said die members 36 will be caused to move radially between the die members 35ª.

Each stave blank 43 before being placed in the machine is of the form shown in Fig. 26, and is curved or arched lengthwise according to the shape of the barrel but is flat and not bilged transversely, and said blank is adapted to lie upon the face of one of the dies 35. The blanks are alined between the angular plates or gages 38 located at the opposite corners of the die member 36 and on the die members 35ª, and each blank after being formed under the first die movement is held at its ends by means of the grippers 44 on the ends of the levers 45. These levers 45, two for each die, are pivoted at 46 to the relatively movable die members 36 and move inward and outward therewith. The clamping levers each extend through a slot in one of the turret heads and each lever has a roll or trundle 47 which is adapted to rest against a cam surface 48 of one of the fixed cams 39, the said levers 45 being each normally forced in one direction by a spring 49, one end of which is held to a lever and the other end to one of the die members 36. This cam surface is plane for substantially half of the diameter of the cam and is so formed and positioned that the grippers are allowed under the action of the springs 49 to grip the ends of the blank as the turret moves from the first forming position to the second position where the flanges are turned over as will be presently described. These grippers 44 thus hold the blank in position on the die part or member 36 after the forming surface has been forced by means of the cam 39 beyond the die members 35$^a$. The cams 39 allow the grippers 44 to hold the blanks until the turret carries the blanks to the lowest position when the levers 45 are forced open by the cams 39 and the blanks are allowed to drop from the turret.

The blanks, when the machine is in the position shown in Fig. 2, are placed on the die nearest the uppermost one, and in this position the cams 39 have already forced the die member 36 inward. The turret, if given a movement of one-sixth of a complete rotation through the Geneva movement and the mechanism hereinbefore described, will place the blank with the die member 36 beneath the same under a punch or plunger 50. In this position the outer face of the die member 36 is somewhat below the outer faces of the members 35$^a$ to provide shoulders, so that when the punch 50 is forced inward, as will be presently described, the blank will have its edges lengthwise thereof forced upward to form flanges, as at 51, Fig. 27, and at the same time the blank is curved or bilged transversely, the ends of the die member 36 during this flange-forming operation being made to rest on the bottom of the radial slots 36$^a$ to take the shock of said plunger 50. This punch 50 is carried by a vertically reciprocatory cross-head 52, and said cross-head 52 is guided in brackets or guides attached to or carried by the machine frame. The punch 50 may be made of cast metal or otherwise, and may be hollowed for lightness and is curved lengthwise thereof according to the curvature of the die members 36 and the shape of the barrel to be made. The punch has lugs 53 by which the said punch may be securely bolted to the cross-head 52, said punch 50 being curved oppositely to that of the member 36 with which it coöperates. The cross-head 52 has brackets 54 to which are held connecting rods 55, the latter being operated by crank portions 56 formed as a part of the shaft 23, so that at each rotation of the shaft 23 through the train of gearing already described, a reciprocatory movement will be imparted to the cross-head 52 and to the punch 50 to form the longitudinal flanges along the edges of the barrel staves.

As the thickness of the metal from which the barrel staves are made may vary, some means is desirable as an adjustment between the die member 36 and the punch 50. To accomplish this adjustment, various means may be employed. As shown, a shaft 57 is provided, and on this shaft is a worm gear 58. This gear is in mesh with a worm integral with a stud 59 mounted on the crosshead 52 and rotatable in bearings 60 provided therefor. This shaft 57 has an eccentric or crank portion 61 at each end, to which the rods 55 are pivoted, so that by rotating the stud 59 to rotate the shaft 57, the position of the eccentric portions 61 may be changed and consequently the position of the punch 50. By this means a very simple and effective adjustment is secured between the dies 36 and punch 50 so that various thicknesses of metal blanks may be used without over-straining the machine.

In the form of metallic barrel set forth in the patent hereinbefore referred to, beads are formed for the hoops, intermediate the ends and transversely of the staves, and the ends of the staves are bent or beaded to provide grooves or shoulders for the barrel heads. The intermediate grooves or depressed portions are formed by die members 62 carried by the punch 50 and oppositely constructed die members 63 in the die members 36. These die members 62 and 63 may be separate and independent pieces inserted in the punch 50 and die members 36, and said members 62 have projecting portions 64 and the die members 63 have grooves or slotted portions 65 adapted to receive the beaded or depressed portions and thereby form the transverse grooves or beaded portions on the barrel staves at the same time that the blank is bilged and formed with flanges lengthwise thereof. At the ends of the punch 50, die pieces 66 are provided and these pieces have shoulder portions 67 at their ends which are adapted to coöperate with the die members 68 of the turret die member 36, the said die members 68 being provided with projecting parts 69 to pass under the shoulder or part 67 and thus form the grooves and offset parts for the barrel heads at the ends of the staves.

To bend the flanges over the body of the blank or stave lengthwise thereof as required in the patent referred to, the turret with the blank or stave is given a movement one-sixth of a complete rotation as already described to position the blank under the bending mechanism 70. This mechanism is arranged at an angle of about thirty degrees according to the construction shown, though this angle may vary according to the number of dies carried by the turret 27. This mechanism 70 comprises a cross-head 71, Figs. 2, 3, 13 and 14, which is suitably guided in a part of the machine frame, and this cross-head is adapted to be moved by eccentrics 72 formed on the shaft 21 and operating the eccentric straps 73, which straps 73 are connected to a yoke 74 held to rods 75. The rods 75 and yoke 74 normally move with the cross-head 71 but may have a relative independent movement for a purpose to be presently described. The cross-head 71 has ears or lugs 76 to guide the rods 75, and said rods are provided with collars 77 adapted to engage and be held normally under the upper lugs of the cross-head. A spring 78 is interposed between each collar and the inner lugs of the cross-head, tending normally to force the yoke away from the cross-head. The inner ends of the rods 75 are pivoted at 79 to lugs or projections of the bender members 80. These bender members are pivoted to rods 81 carried by the cross-head, and each bender has a bender plate or member 82 rigidly held thereto, the lower inner edge of which is cut away according to the curvature of the flanges of the stave and the depth of the flanges when bent inward. As shown, the bender plates 82 are supported by three brackets 83 bolted or secured thereto, though this construction may vary, the said bender plates being adapted to coöperate with the former members 84. The former members or devices 84 are intended to support the flanges from within to permit the same to be bent over at an angle, as shown in Fig. 28, and it is necessary that these members be capable of a collapsing movement to adapt said members to be removed from the flanges away from the stave after the flanges have been inturned. The members 84 correspond in shape to the stave and are carried by arms 85 which are pivoted to the rods 81 forming supports for the bender members, and each former member 84 has an offset portion or rib, as at 86, to enter under the flanges, the said ribs being formed as a part of said former member 84 or as a separate bar or strip 87 as shown.

As a means to expand or to force the former members outward in position to engage the flanges ready to permit the bender members to bend the outer edge of the flanges inward in the manner shown in Fig. 28, I arrange cut-away or cam portions 88 in the members 84 which are adapted to be engaged by the tapered ends 89 of rods 90. These rods 90 are held to reciprocate in the cross-head 71 and the upper ends thereof are held to forked or bifurcated portions 91 which are adapted to straddle the shaft 21 and be guided thereby. The forked end 91 of each rod 90 carries a stud 92 on the inner end of which is a trundle which enters a cam groove 93 of a cam 94. These cams 94 are secured to the shaft 21 and as the shaft 21 is rotated, the rods 90 will be reciprocated and forced in one direction inward, and by reason of the tapered end 89 will cause the former members 84 to be spread apart as shown in Fig. 14, and to be held in this position by the straight part of said rods, the cross-head together with the bender members 80 being also forced inward by the eccentrics 72 until the former members 84 engage the flanged blank on one of the turret dies. On further movement of the shaft 21, the springs 78 will yield, permitting the yoke 74 to continue inward and by reason of the rods 75 being pivoted to the bender members, a part of the flanges lengthwise of the stave will be bent inward over the stave body to form substantially L-shaped locking flanges, the position of the parts of the bending mechanism being shown in Fig. 14. As the shaft 21 is further rotated, the cams 94 will force the rods 90 outward causing the enlarged or cam portions 95 to engage rollers 96 on the arms 97 of the former members which will positively force said former members 84 inward to collapse the same and permit their withdrawal, and as the shaft 21 continues to rotate, the eccentric straps 73, by reason of the action of the springs 78, will cause the yoke to first recede or move away from the cross-head until the bender members 80 have also been released from the stave flanges. Further movement of the shaft causes the entire head and bender mechanism to be moved outward in position to receive the next stave blank the flanges of which are to be turned over. It will thus be seen that the blanks are acted on in succession, and that while one blank is being acted on by the punch 50, the flanges on another blank or stave are being bent over by the mechanism 70.

The turret if given a partial rotation will place another blank in position to have the locking flanges formed and the blank bilged and beaded transversely of the staves, and on the next movement of the turret, owing to the cams 39, the ends of the spring-held levers 45 will be released from the staves and the completed staves will be discharged upon a chain carrier 98. This carrier comprises a plurality of chains which extend lengthwise of the machine under the turret 27 and may be of any suitable number and arranged in any desired way. The chains are in the form of sprocket chains and are passed about the sprocket wheels 99 secured to the shafts 100 and 101. The shaft 100 has a gear 102 at one end which meshes with an idler 103, and this idler is in mesh with a gear 104 on the turret shaft 28 and by which the carrier is operated. The machine thus not only automatically makes the barrel staves, but also conveys the same away from the machine to be assembled into barrels or not as preferred.

The invention will be readily understood from the foregoing description when taken in connection with the accompanying drawings. Assuming that the parts are in the position shown, one of the blanks similar to that shown in Fig. 26, is placed over one of the dies 35 next preceding the one under the punch 50, and in this position is alined and held by the angle plates 38. The machine may now be started and through the train of gearing hereinbefore described, the shaft 28 of the turret 27 will be given an intermittent movement of one-sixth of a rotation. This will place the blank under the punch 50 with the die member 36 resting on the bottom of the slots 36ᵃ in the turret heads. A reciprocatory movement at this time is given to the cross-head 52 carrying the punch 50 so as to form the flanges, and at the same time the blank is bilged and beaded or grooved transversely at its ends for the barrel heads and at two places intermediate its ends for the binding hoops. On the next movement of the turret, the blank or stave is placed in alinement with the bending mechanism 70, a new blank being being placed under the punch 50 to take the place of the one already acted on, in order that two blanks may be acted upon simultaneously.

The blank with its flanges turned outward in the manner shown in Figs. 27 and 29, is positioned so that the cross-head 71 with the former members or plates 86 in an expanded position may be moved inward by the rotation of the shaft 21, which operates the eccentrics and moves said cross-head inward to force the former members against the outer surface of the blank. The shaft 21 continues to rotate and will move the yoke 74 relatively to the cross-head owing to the springs 78. This action will force the bender members 80 on their pivots so as to bend the outer part of the flanges inward and substantially parallel with the barrel staves so as to form substantially L-shaped means for locking the barrel staves together when the barrel is assembled. As the reverse operation of the bending mechanism takes place, the cams 94, through the trundle on the stud 92, causes the devices 86 to collapse for removal from the stave flanges and the bender members 80 to return to the open position, as shown in Fig. 13, leaving the barrel stave complete and still held by the holding levers 45. A further movement of the turret places other blanks in position to be completed, and when the turret is moved far enough to place a stave over the carrier 98, the holding levers 45 will be released so that the completed stave will be deposited or discharged upon said carrier, the latter conveying the staves to the rear of the machine.

From the foregoing, it will be seen that a simple and efficient machine is provided whereby steel or other metallic barrel staves may be automatically made to adapt barrels with a bilged or enlarged central portion to be made; that simple and efficient mechanism is provided for forming the flanges along the longitudinal edges thereof and curved to the shape of the barrel when assembled; that simple means is provided for forming grooves or offset parts in the staves at the ends for the barrel heads and beads intermediate the ends for the hoops of the barrel; that simple mechanism is provided for bending the flanges inwardly so as to form substantially L-shaped locking portions; that simple means is provided whereby blanks may be held in position from the time they are placed in the machine and automatically operated upon in succession; and that more than one blank may be acted upon at the same time and the completed blank automatically discharged from the machine.

Having thus described my invention, I claim as new and desire to secure by Letters Patent:—

1. In a machine of the character described, the combination of rotary supporting means, a plurality of dies each having fixed and relatively movable members mounted on said supporting means and conforming to the general shape of the staves, means for holding stave blanks on the dies, transverse die members carried by the first-mentioned dies, a reciprocatory cross-head, means for reciprocating said cross-head, a punch having die members extending transversely thereof and conforming to the shape of the stave body, together with means for reciprocating the cross-head and punch carried thereby to cause the blank to have flanges formed thereon lengthwise and to have depressed portions transversely of the blank.

2. In a machine of the character described, the combination with a turret having heads, a plurality of bar-like die members extending between said heads and conforming to the general shape of the staves and a relatively movable die member movable between each pair of bar-like members and also conforming to the general contour of the stave, means for moving the movable die member inward and outward, means for intermittently rotating the turret, means for holding stave blanks on the die members, a reciprocatory cross-head, means for reciprocating said cross-head, a punch coöperating with the turret dies, die members extending transversely of the punch and the turret dies, together with means for reciprocating the cross-head and punch.

3. In a machine of the character described, the combination of a plurality of dies each having relatively fixed and movable members conforming to the general shape of the staves, a reciprocatory punch coöperating with the dies in succession to simultaneously bilge a stave blank and form beads transversely thereof and locking portions lengthwise of said stave blanks, means for intermittently moving the dies, and means for bending a part of said locking portions.

4. In a machine of the character described, the combination of a die comprising a plurality of members, means for imparting a relative independent movement between one of said die members and the others, a vertically movable cross-head, a punch carried by said cross-head, means for reciprocating the cross-head and punch, together with independent bending mechanism.

5. In a machine of the character described, the combination of a turret having a plurality of dies thereon, said dies each comprising a plurality of members, means for rotating said turret, means for moving one of said die members radially, a vertically movable cross-head, a punch carried by said cross-head, means for adjusting the punch relatively to the dies of the turret, means for reciprocating the cross-head and punch to form flanges lengthwise of the stave blanks, together with independent means for bending the flanges of each stave.

6. In a machine of the character described, the combination of punch and die mechanism for forming flanges longitudinally of a blank, means for crimping the blank transversely, and bending mechanism including collapsible members for bending over the flanges.

7. In a machine of the character described, the combination of rotary means for holding and supporting a plurality of blanks and for forming flanges along the longitudinal edges of each blank, and independent bending mechanism acting upon the blanks in succession to bend a part of the longitudinal flanges inward over the body.

8. In a machine of the character described, the combination of a support, a rotary turret mounted upon said support and having a plurality of dies, a punch coöperating with the dies in succession to form flanges along the longitudinal edges of the blank, and independent mechanism coöperating with the turret dies to bend over the flanges.

9. In a machine of the character described, the combination of a support, a rotary turret mounted upon said support and having a plurality of blank-supporting dies, and means coöperating with the dies in succession to form staves with locking portions lengthwise thereof.

10. In a machine of the character described, the combination of a support, a rotary turret mounted upon said support and having a plurality of blank-supporting dies, means coöperating with the dies in succession to form staves with locking portions at the edges and lengthwise thereof, and means for beading the staves transversely.

11. In a machine of the character described, the combination of a die, a cross-head, means for reciprocating said cross-head, a punch held to the cross-head, die members extending transversely of the punch and first-mentioned die to depress parts of the blank transversely and conforming in shape to the bilge of the blank, together with means for reciprocating the cross-head and punch.

12. In a machine of the character described, the combination of a turret having heads and a plurality of dies extending between said heads and conforming to the general shape of the staves, each die comprising two fixed and one relatively movable member, and means coöperating with the dies in succession to form locking portions on the staves.

13. In a machine of the character described, the combination of a turret having heads and a plurality of dies extending between said heads and conforming to the general shape of the staves, each die comprising relatively fixed and movable members, and means coöperating with the dies in succession to bilge the blank and form locking flanges along the longitudinal edges of the blank.

14. In a machine of the character described, the combination with means for holding and supporting a blank and for forming flanges lengthwise thereof, of a reciprocatory former adapted to coöperate with a part of the flange-forming means to engage the flanges from within the same, means for expanding and collapsing the former, together with movable bender members for bending the flanges lengthwise thereof over the former.

15. In a machine of the character described, the combination with means for holding and supporting a blank and for forming flanges lengthwise thereof, of a reciprocatory former adapted to coöperate with a part of the flange-forming means to hold the flange from within the same, means for expanding and collapsing said former, together with movable bender members for bending the flanges lengthwise thereof over the former.

16. In a machine of the character described, the combination with means for forming flanges lengthwise of the stave blanks, of reciprocatory means adapted to coöperate with a part of the flange-forming means to hold the flange from within the same, together with bender mechanism for bending the flanges lengthwise thereof over said reciprocatory means.

17. In a machine of the character described, the combination of a turret, means for forming flanges lengthwise of stave blanks and offset depressed portions transversely thereof, a former having two pivotally held members adapted to coöperate with a part of the flange-forming means and having ribbed edges adapted to rest on the inside of the flanges of the blank, rods having cam portions operatively connected to said members and adapted to collapse or expand the same, means for operating the rods, two pivotally held bender members adapted to bend a part of the flanges lengthwise of the blank over the ribbed portions of the holding members, a reciprocatory cross-head to which said members are held, rods connected to the bender members, means for yieldingly forcing the rods in one direction against a part of the cross-head, a yoke connecting the rods, and means connected to the yoke for operating the cross-head and yoke together and for imparting a relatively different extent of movement to the yoke and to the cross-head after the cross-head has moved a certain distance to operate the bender members.

18. In a machine of the character described, the combination of means for forming flanges lengthwise of stave blanks, a former having two pivotally held members adapted to coöperate with a part of the flange-forming means, rods having cam portions operatively connected to said members and adapted to collapse or expand the same, means for operating the rods, and bender mechanism coöperating with the former to force a part of said flanges over said former.

19. In a machine of the character described, the combination of means for forming flanges lengthwise of stave blanks, a former, means for operating the former, a reciprocatory cross-head, bender members held to said cross-head, rods connected to the bender members, means for yieldingly forcing the rods in one direction against a part of the cross-head, a yoke connecting the rods, and means connected to the yoke for operating the cross-head and yoke together and for imparting relatively different movements to the yoke and to the cross-head after the cross-head has moved a certain distance to operate the bender members.

20. In a machine of the character described, the combination of means for forming flanges lengthwise of stave blanks, a former having expanding and contracting members, and movable bender members coöperating with said former members to bend a part of the stave flanges.

21. In a machine of the character described, the combination of means for forming flanges lengthwise of staves, a former having contracting and expanding members, bender members, a reciprocatory cross-head to which said former and the bender members are held, rods connected to the bender members, means for yieldingly forcing the rods in one direction against a part of the cross-head, a yoke connecting the rods, and means connected to the yoke for operating the cross-head and yoke together and for imparting relatively different movements to the yoke and to the cross-head.

22. In a machine of the character described, the combination of means for forming flanges lengthwise of the blank, and depressed portions transversely thereof, a former having two pivotally held members having ribbed edges adapted to rest on the inside of the flanges of the blank, rods having cam portions operatively connected to said members and adapted to positively operate the same to collapse or expand said members, means for operating the rods, and bender mechanism coöperating with the former members for the purpose set forth.

23. In a machine of the character described, the combination of means for forming flanges lengthwise of a blank, a former, bender members, a reciprocatory cross-head to which said former and bender members are held, rods connected to the bender members, means for yieldingly forcing the rods in one direction, a yoke connecting the rods, and means connected to the yoke for operating the cross-head and yoke together and for imparting relatively different movements to the yoke and to the cross-head.

24. In a machine of the character described, the combination of means for forming flanges lengthwise of the blank, a former having two pivotally held members adapted to coöperate with a part of the flange-forming means and having ribbed edges adapted to rest on the inside of the flanges, rods having cam portions operatively connected to said former members and adapted to collapse or expand the same, means for operating the rods, and two pivotally held bender members adapted to bend a part of the flanges over the former members.

25. In a machine of the character described, the combination of means for forming flanges lengthwise of stave blanks, a former, bender members, and means for imparting relatively different reciprocatory movements to the former and bender mechanism.

26. In a machine of the character described, the combination of means for forming flanges lengthwise of the blank, a former having two pivotally held members adapted to coöperate with a part of the flange-forming means and adapted to rest on the inside of the flanges, means for operating said members to collapse or expand the same, two pivotally held bender members adapted to bend a part of the flanges lengthwise of the blank over the former members, bender members, a reciprocatory cross-head to which said former and bender members are held, rods connected to the bender members, means for yieldingly forcing the rods in one direction, a yoke connecting the rods, and means connected to the yoke for operating the cross-head and yoke together and for imparting relatively different movements to the yoke and to the cross-head.

27. In a machine of the character described, the combination of a turret having a plurality of dies, means coöperating with said dies to form flanges lengthwise of a stave, a carrier, and means for automatically discharging the completed stave on said carrier.

28. In a machine of the character described, the combination of a turret having a plurality of dies thereon extending transversely of the machine, means for forming substantially L-shaped flanges lengthwise of a stave blank, a carrier, and means for automatically discharging the completed stave on said carrier.

29. In a machine of the character described, the combination of a turret having a plurality of dies, blank-alining means on said dies, and clamping means to hold the blank over the dies.

30. In a machine of the character described, the combination of a die, means coöperating with said die to form locking flanges along a stave blank, angular alining brackets located on the die, and spring-held and cam-operated clamping levers for holding the blank on the die.

31. In a machine of the character described, the combination of a turret having a plurality of dies extending transversely of the machine, means coöperating with the dies for forming flanges lengthwise of a stave blank, clamping levers adapted to hold a blank to each die, and cams for releasing said levers.

32. In a machine of the character described, the combination of a rotary turret having blank-holding dies, a punch coöperating in succession with the dies of the turret to form flanges lengthwise of the blanks, an angularly arranged and reciprocatory former having expanding and collapsing members to support the flanges of the different blanks in succession, means coöperating with said former to bend a part of the blank inward lengthwise thereof and acting independently of the first-mentioned flange-forming means, a carrier, and means for discharging the completed stave on to the carrier, all of which parts are automatically operated.

33. In a machine of the character described, the combination of a die, a punch coöperating with the die to form flanges lengthwise of the blanks, an angularly arranged and reciprocatory former having expanding and collapsing members to support the flanges of the blanks, means coöperating with said former to bend a part of the blank inward lengthwise thereof, a carrier, and means for discharging the completed stave on to the carrier, all of which parts are automatically operated.

34. In a machine of the character described, the combination of a turret having heads provided with radial slots, of a plurality of dies each having a movable member, the ends of which are guided in said slots and in one position rest against the bottom thereof, and flange-forming means coöperating with said dies to form flanges lengthwise along the edges of stave blanks.

35. In a machine of the character described, the combination of heads provided with slots, a die having a movable member, the ends of which are guided in said slots and in one position rest against the bottom thereof, and flange-forming means coöperating with said die.

36. In a machine of the character described, the combination of a turret having heads provided with radial slots, of a plurality of dies each having a movable member the ends of which are guided in said slots and in one position rest against the bottom thereof, and a plunger coöperating with said dies to form flanges lengthwise along a stave blank and to form depressions transversely of said blank.

37. In a machine of the character described, the combination of heads provided with slots, of a plurality of dies each having a movable member, the ends of which are adapted to be guided in said slots and to rest against the bottom thereof, and a plunger coöperating with said dies.

This specification signed and witnessed this eleventh day of October, A. D. 1911.

BENJAMIN W. TUCKER.

Witnesses:
 FREDERICK B. BLACKMAN,
 CECELIA A. HURLEY.